H. D. COLMAN.
WINDER.
APPLICATION FILED FEB. 1, 1915.

1,274,386.

Patented Aug. 6, 1918.
3 SHEETS—SHEET 1.

Witnesses:
J. C. Devik.
George L. Chindahl

Inventor:
Howard D. Colman.
By Luther L. Miller
Atty.

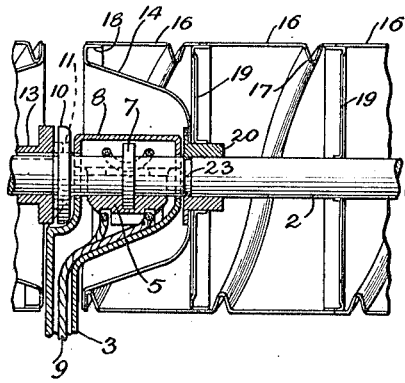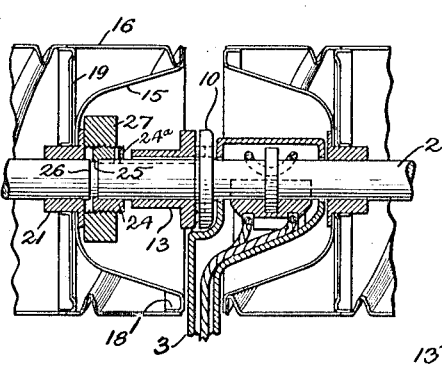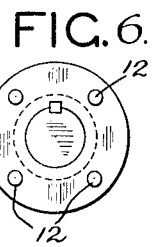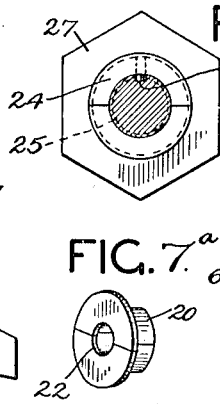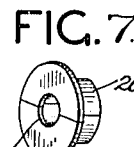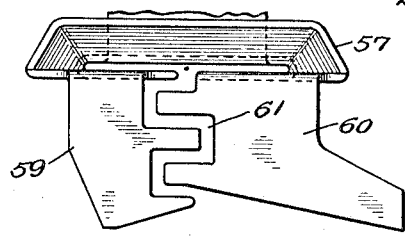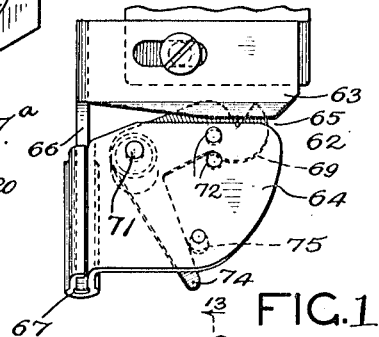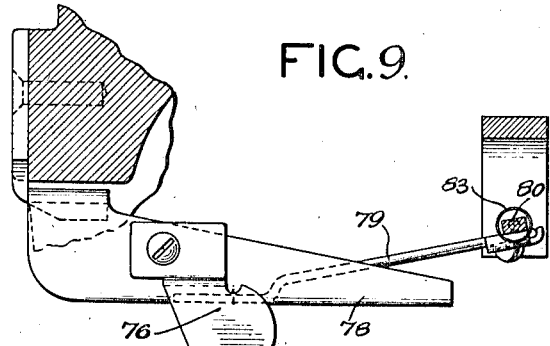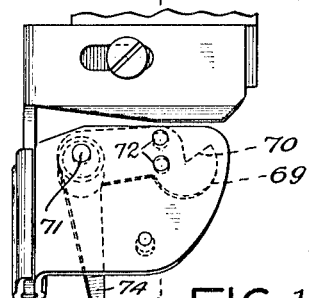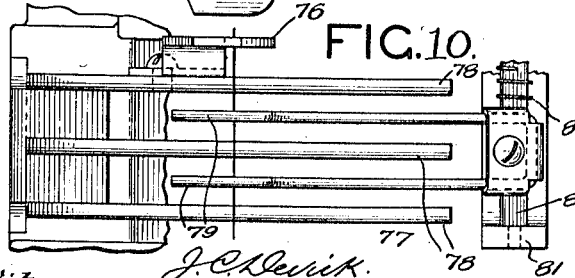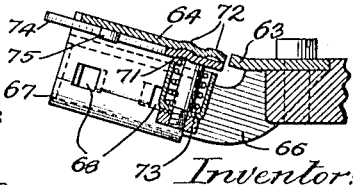

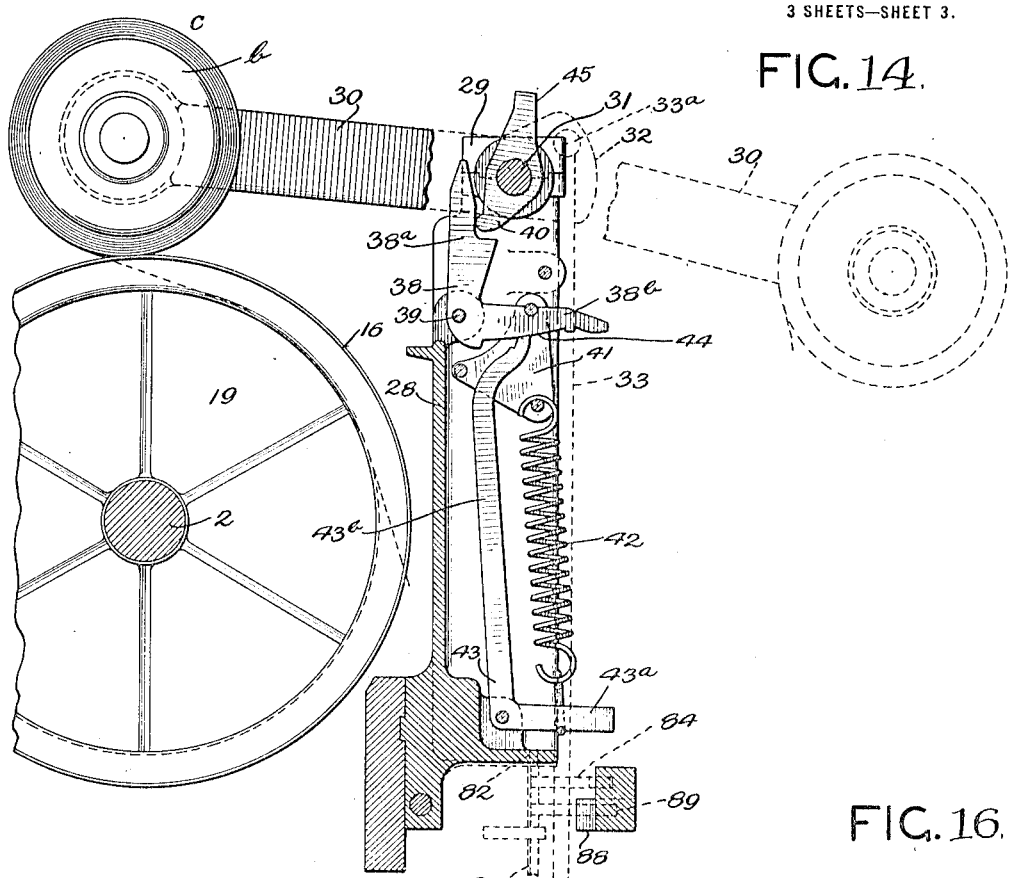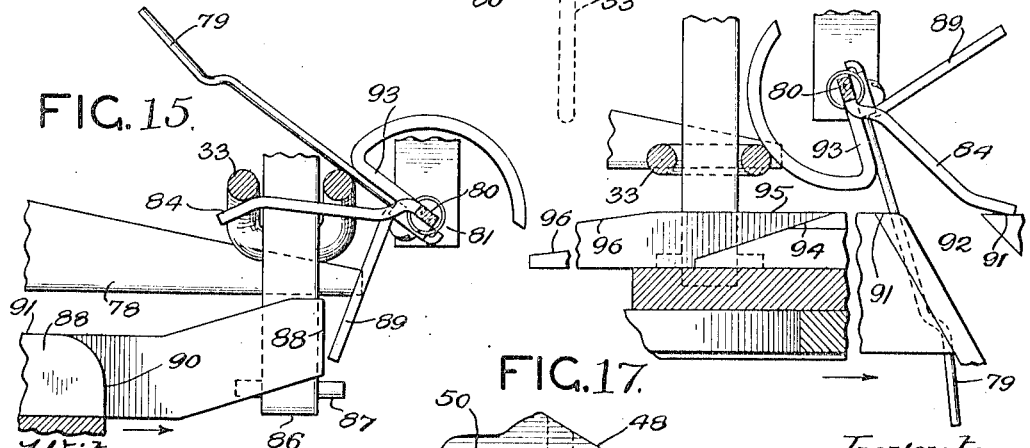

UNITED STATES PATENT OFFICE.

HOWARD D. COLMAN, OF ROCKFORD, ILLINOIS, ASSIGNOR TO HOWARD D. COLMAN, LUTHER L. MILLER, AND HARRY A. SEVERSON, COPARTNERS TRADING AS BARBER-COLMAN COMPANY, OF ROCKFORD, ILLINOIS.

WINDER.

1,274,386.     Specification of Letters Patent.     Patented Aug. 6, 1918.

Application filed February 1, 1915. Serial No. 5,563.

*To all whom it may concern:*

Be it known that I, HOWARD D. COLMAN, a citizen of the United States, residing at Rockford, in the county of Winnebago and State of Illinois, have invented certain new and useful Improvements in Winders, of which the following is a specification.

This invention relates to machines for unwinding a yarn mass to form another yarn mass, as for example, a machine for winding yarn from bobbins onto spools, or onto tubes to form cheeses. Some features of the invention have particular reference to automatic winders, as, for example, a machine of the general type disclosed in application Serial No. 628,474, filed by me on May 25, 1911. (Patent No. 1,175,710, dated March 14, 1916.)

One of the objects of the invention is to provide improved means for throwing the receiving yarn-mass out of operation upon the exhaustion of the thread.

Another object is to provide means to prevent the receiving yarn-mass from becoming eccentric.

Another object is to produce a light, compact and relatively inexpensive form of cam-drum for rotating the receiving yarn-mass and traversing the yarn.

A further object is to provide a sectional construction of the shafts that carry the cam drums, in order to facilitate the manufacture and erection of the machine.

A further object is to provide improved means for guiding the running thread.

A further object is to provide means for delaying the engagement of the thread with the cam groove until the receiving yarn-mass has been accelerated.

A further object is to provide improved means for clearing the yarn.

Figure 1:
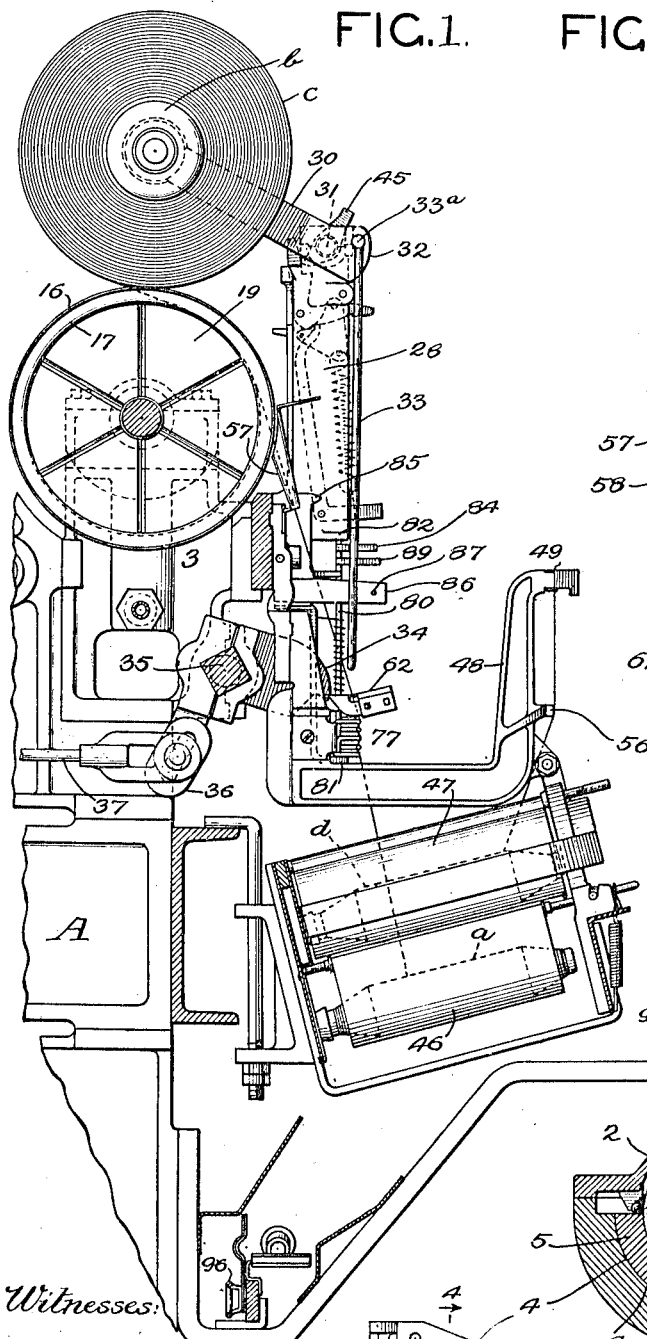
Figure 2:
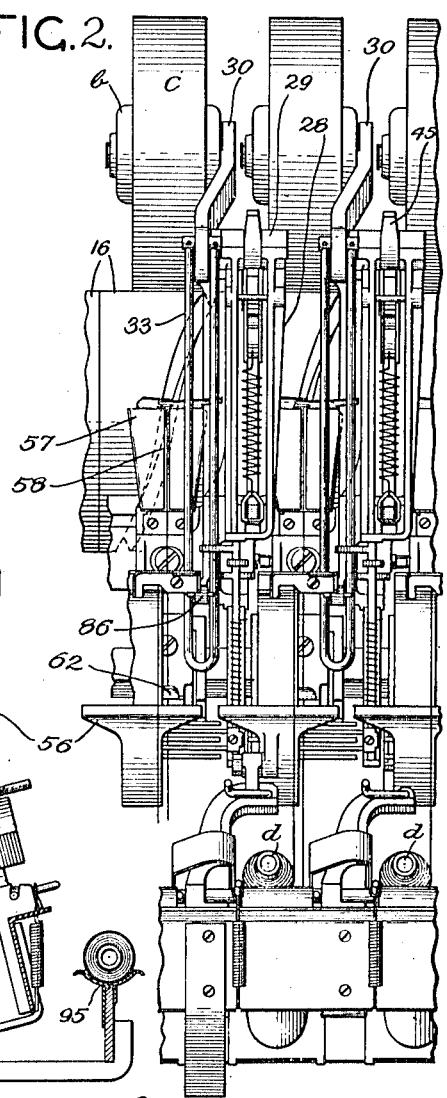
Figure 3:
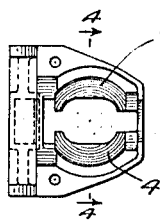
Figure 4:
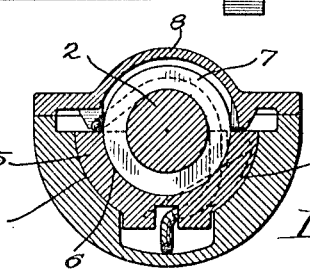

In the accompanying drawings, Figure 1 is a fragmental transverse vertical sectional view of a winder embodying the features of my invention. Fig. 2 is a fragmental side elevation of the winder. Fig. 3 is a top plan view of one of the cam-shaft supporting standards. Fig. 4 is a section on line 4—4 of Fig. 3. Fig. 5 is a fragmental sectional view illustrating the construction and mounting of the cam drums by means of which the cheeses are rotated and the yarn traversed. Fig. 6 illustrates a portion of the coupling that connects adjacent sections of the cam shaft. Figs. 7 and 7ª illustrate part of the means for connecting the cam drums to the cam shaft. Fig. 8 is a top plan view of certain thread-guiding means. Fig. 9 is a top plan view of a thread guide and a detector. Fig. 10 is a front view of the parts shown in Fig. 9. Fig. 11 is a plan view of a yarn clearer. Fig. 12 is a view similar to that shown in Fig. 11, but showing the parts in another position. Fig. 13 is a sectional view taken in the plane of dotted line 13—13 of Fig. 12. Fig. 14 is a fragmental view illustrating the means for preventing the cheese from becoming eccentric. Figs. 15 and 16 illustrate the operation of resetting the detector mechanism. Fig. 17 is a plan view of a reserve thread clamp.

The present embodiment of the invention consists of mechanism for unwinding yarn from bobbins $a$ onto tubes $b$ to form cheeses $c$, and a mechanism arranged to travel along the winding mechanism and attach the ends of the yarn on the bobbins to the ends of the yarn on the cheeses and perform various other operations attending the production of cheeses. Only a small portion of the traveling mechanism is herein shown. The winder consists of an elongated framework A providing two parallel sides, each side having means for supporting bobbins, and means for supporting and rotating cheeses. The winder-tending mechanism travels around the winder and ties the end of the yarn on a reserve bobbin $d$ to every cheese, except in the case of cheeses that have reached the desired size.

The cheeses are rotated through peripheral contact with rotary drums 1. While these drums may be of any suitable construction, it is desirable, for the sake of lightness, to make them in some such way as is shown in Fig. 5. For the sake of convenience in manufacturing and erecting the winder, the winder is divided into sections which may be termed "bays". As a winder embodying the invention is often of considerable length, thus making it difficult perfectly to aline the drums, the drums for each bay are fixed upon a shaft section 2 which is connected with a sufficient degree of looseness to the adjacent shaft sections.

Each shaft-section is supported in part by an adjacent shaft-section and in part by a bearing constructed as follows: A standard 3 (Fig. 1) fixed in the machine frame is provided at its upper end with a socket 4 (Figs. 3 and 4) to receive a hemispherical bearing block 5 of brass or other suitable material. The block 5 has a groove 6 to receive a collar 7 fixed on the shaft section 2. 8 is a cap for the upper end of the standard 3. Said standard is chambered to receive a supply of lubricant and a wick 9 (Fig. 5) to conduct the lubricant to the shaft bearing. The end of the shaft which is supported by the bearing just described is provided with a flange 10 having a suitable number of openings 11. These openings receive pins 12 (Fig. 6) carried by a flanged collar 13 which is keyed on the adjacent end of the adjacent shaft-section 2. Rotation is imparted to one of the end-sections 2 at each side of the winder, power being transmitted to the other shaft-sections through the couplings formed by the flanges 10 and collars 13. These couplings are sufficiently flexible so as to obviate the necessity of exact alinement of the shaft-sections. The bearing blocks 5 adjust themselves to the positions of the shaft-sections.

The drums are preferably formed of sheet-metal. The set of drums carried by each shaft section 2 comprises two end members 14 and 15 and a series of cylinders 16. Each cylinder 16 has a cam groove 17 formed therein. The end cylinders 16 have a driving fit upon the flanges 18 of the members 14 and 15. The intermediate cylinders 16 abut against each other and against the end cylinders. The abutting ends of the cylinders are supported upon flanged webs 19 which have a driving fit within the cylinders. One end of the set of drums is supported upon a flanged sleeve 20 and the other end upon a flanged sleeve 21, said sleeves being mounted upon the shaft-section 2. The end webs 19 are mounted on the sleeves 20 and 21, the intermediate webs 19 resting directly upon the shaft-section 2. The set of drums is rigidly secured to the shaft-section 2 in the following described manner: The sleeve 20 has an annular flange 22 (Fig. 7$^a$) which fits into an annuular groove 23 in the shaft-section. Said sleeve is made in two halves to permit its application to the shaft. Adjacent to the sleeve 21 is a collar 24 having an annular flange 25 which fits into an annular groove 26 in the shaft-section. The collar 24, like the sleeve 20, is formed in two halves. The periphery of the collar 24 is screw-threaded to receive a nut 27 which is arranged to bear against the flange of the sleeve 21. By means of the nut 27 the set of drums is clamped between the flanges of the sleeves 20 and 21. The collar 24 is prevented from rotating with reference to the shaft-section by means of a pin 24$^a$ fitting in a keyway in the shaft-section.

In order that the winder units may be uniformly spaced apart, the end members 14 and 15 are dished, as shown, to receive the shaft bearings, the sleeves 13 and the clamping means 24 and 27; and the end cylinders 16 are somewhat shorter than the intermediate cylinders 16 to provide space for the standards 3.

In the rotation of the shaft-sections 2, the cam grooves 17 guide the yarn back and forth and thus build up cross-wound yarn masses on the tubes $b$.

Each winder unit comprises a bracket 28 (Fig. 14) having a bearing 29 at its upper end. A cheese-supporting lever 30 is provided upon one side and near one end with a pivot 31 which is mounted in the bearing 29, said pivot being rigid with the lever. At the end of the long arm of the lever 30 is means for rotatably supporting a cheese, which means may be of any suitable character. To the short arm 32 of the lever 30 is pivoted at 33$^a$ a depending link 33 which may be in the form of an elongated loop. When the yarn exhausts, devices to be presently described swing the link 33 from its normal vertical position to a position within reach of a continuously oscillating hook 34 (Fig. 1) which pulls the link downward and thus throws the lever 30 from the position illustrated in Fig. 1 to that shown in dotted lines in Fig. 14, whereby the cheese is withdrawn from the cam drum. The hooks 34 for the winder units are fixed upon a shaft 35 which may be rocked by any suitable means. Herein is shown a crank arm 36 fixed to the shaft 35 and connected by means of a link 37 to a suitable rotatory or oscillatory device (not shown).

Means is provided for pressing the cheese against the cam drum and for correcting any tendency to the formation of an eccentric yarn mass on the tube $b$, which means will next be described. A bell-crank lever 38 (Fig. 14) is pivoted at 39 to the bracket 28. The arm 38$^a$ of said bell-crank is arranged to bear against a lug 40 fixed with relation to the pivot 31. A hanger 41 is suspended from the other arm 38$^b$ of the bell-crank lever 38 and is connected by means of a coiled spring 42 to the arm 43$^a$ of a lever 43 pivoted to the bracket 28. The other arm 43$^b$ of the lever 43 bears against the surface 44 of the lever arm 38$^b$. The hanger 41 prevents lateral displacement of the lever arm 43$^b$. Referring to Fig. 14: As the cheese increases in diameter, the upward swinging movement of the lug 40 causes the bell-crank lever 38 to tilt, the lever arm 43$^b$ moving under the action of the spring 42 so as to remain in contact with the surface 44 during such movement of the bell-crank lever 38, the arm 43ᵇ thus serving to prevent movement of the bell-crank lever 38 in the opposite direction. It will be seen that the arm 38ᵃ resists upward movement of the cheese, but does not tend to cause downward movement of the cheese, since the arm 43ᵇ is continually in position to prevent downward movement of the lever arm 38ᵇ. Thus, if, for any reason, there should be a tendency toward the production of an eccentric yarn mass on the tube b, the high point of the yarn mass will receive the pressure of the spring 42, while the low point will be relieved of such pressure.

When the formation of a cheese is started, the lug 40 stands at an acute angle to the arm 38ᵃ. As the diameter of the cheese increases, the lug 40 turns toward a position at a right angle with the arm 38ᵃ, whereby the spring pressure transmitted to the lever 30 decreases. This graduation in pressure is provided so that the central portion of the cheese shall be harder than the outer portion, thus lessening the spreading tendency exerted by the outer layers of yarn on the inner layers.

When the cheese is thrown out of driving contact with the cam drum, a lug 45 fast on the pivot 31 strikes against the arm 38ᵃ, whereby said arm serves to yieldingly arrest the movement of the lever 30.

Each winder unit comprises suitable bobbin-supporting means. If desired, said means may comprise means for supporting the bobbin being unwound and means for supporting a reserve bobbin. Herein I have shown an active bobbin-holder 46 and a reserve bobbin-holder 47 similar to those fully described in application Serial No. 5,562 filed Feb. 1, 1915. The bobbin-holders 46 and 47 are located in front of and below the cam drum. The end of the thread on the reserve bobbin is held in proper position to be operated upon by the winder-tending mechanism by any suitable means, as, for example, that shown in Figs. 1 and 17. On a stationary bracket 48 is a thread clamp 49 comprising a surface 50 and a movable member 51. The member 51 is yieldingly pressed against the surface 50 by means of a spring 52 that surrounds a screw 53 seated in the bracket 48. On the movable member 51 is an inclined surface 54 which assists the operative in guiding the thread into the clamp. The edge 55 of the movable clamp member limits the extent to which the thread may be inserted into the clamp and thus insures uniformity in the position of the thread end. Below the thread clamp is a bridge 56 (Figs. 1 and 2) across which the thread extends. The thread clamp 49 and the bridge 56 support a portion of the reserve thread in proper position to be operated upon by the winder-tending mechanism. Intermediate the active bobbin and the cam drum the running thread extends through a guide or guard 57 (Figs. 1 and 8) stationarily mounted on the supporting frame adjacent to the cam drum. The form of the guard corresponds generally to the shape of the path traversed by the thread. At its upper end the interior width of the guard is approximately the same as the width of the periphery of the cheese, the guard tapering thence downwardly. The longitudinal center of the guide 57 is located in the vertical plane bisecting the periphery of the cheese. Upon exhaustion of the thread the guard 57 assists to prevent the cam drum from throwing the loose thread laterally off the periphery of the cheese. When the thread is relieved of the drag of the bobbin, the thread seems to jump into contact with the lower end of the guard 57, whereby sufficient resistance is exerted upon the thread to prevent it from being thrown by the cam drum off the periphery of the cheese. The guard 57 also serves the purpose of reducing the amount of flying lint or fiber.

The forward side of the guard 57 is closed, save for an entrance slot 58 (Fig. 2). On the forward side of the guard and at its upper end are two plates 59 and 60 which form between them a zigzag guideway 61. When the cheese is moved from the position indicated in dotted lines in Fig. 14 to that represented in full lines in said figure, the thread passes through the zigzag guideway 61. While the cheese is being accelerated, the bobbin may jump, and thus cause the thread to become somewhat slack. The function of the guideway 61 is to confine the thread against excessive lateral movement, and thus prevent the drum from throwing a thread that is somewhat slack off the periphery of the cheese. The guideway 61 is made of zig-zag form to delay the time of full engagement of the thread with the cam groove 17 until the cheese has been accelerated to some extent by the cam drum, the arc of contact of the thread with the cam groove being gradually lengthened as the thread passes in through the zig-zag guide. It will be understood that the thread is caused to pass inwardly through the zig-zag guideway 61 by reason of rotation of the cheese and the traversing of the thread by the cam groove.

In passing from the bobbin to the guard 57, the thread passes through a yarn clearer 62 (Figs. 1 and 11). The clearer 62 comprises two plates 63 and 64 adjustable toward and away from each other to provide a narrow slot 65 through which the thread may run. The adjustable connection between the plates 63 and 64 comprises an arm 66 on which a guide 67 attached to the plate 64 is slidably mounted and frictionally held. There are openings 68 in the arm 66 and guide 67, which openings are partially out of register and thus provide means whereby the guide 67 can be pried in and out by inserting an instrument into said openings.
The clearer 62 further comprises an arm 69 having a notch 70. The arm 69 is pivoted at 71 so that it may be swung across the slot 65, as shown in Fig. 11. It will be seen that the plates 63 and 64 and the notched portion of the arm 69 provide a restricted passage for the thread and thus act to clear the yarn. To yieldingly hold the arm 69 in its operative and inoperative positions, said arm is provided with a projection 71 (Fig. 13) adapted to snap into either of two depressions 72 in the lower side of the plate 64. 73 is a spring which serves to press the arm 69 against the plate 64. The arm 69 is moved into operative position by a device on the traveling winder-tending mechanism arranged to engage an arm 74 which is rigid with the arm 69. 75 is a stop pin to limit the movement of the arm 74 under action of said device. The yarn clearer is opened by another device on the winder-tending mechanism, said device traveling through the slot 65 and pushing aside the arm 69.

Below the yarn clearer 62 is a stationary thread guide or hook 76, and below the thread guide is a detector 77 (Figs. 1 and 10). Said detector comprises a stationary grid formed, in this instance, of three parallel spaced fingers 78 across which the thread is arranged to run. The detector further comprises a fork consisting of two fingers 79, said fingers being adapted to swing into the spaces between the fingers 78 and bear upon the running thread. The fingers 79 are fixed upon a vertical rock-shaft 80 which is journaled in the supporting frame at 81 and 82 (Fig. 1). A torsion spring 83 tends to rock the shaft 80 in the direction to throw the fingers 79 against the thread. The tension of the running thread normally holds the fingers 79 in the position shown in Figs. 1, 9 and 10. When the thread exhausts through the emptying of the bobbin or the breakage of the thread, the thread can no longer restrain the fingers 79 against the tension of the spring 83, whereupon said spring turns the shaft 80. During such turning movement an arm 84 fixed on the shaft 80 swings the link 33 into the range of action of the hook 34. Upon its next downward movement the hook catches the link 33 and throws the cheese into the position shown in dotted lines in Fig. 14, where it remains until the winder-tending mechanism arrives and ties in the reserve thread. Should the link 33 be swung toward the hook 34 while the latter is moving downwardly and is past the point where it can catch the link, the link stops against the front end of the hook until the hook has completed its downward movement and has risen clear of the link, whereupon the link completes its rearward movement and is caught by the hook upon the next downward movement of the latter.

After the cheese has passed the highest point in the throwing-out movement, the rearward and upward movement of the point 33$^a$ causes the link 33 to fulcrum on a projection 85 (Fig. 1), whereby the lower end of the link is swung forwardly away from the hook 34. The cheese is thereby permitted to complete its throwing-out movement by gravity without waiting for the hook 34 to rise. By reason of the said forward swinging movement of the lower end of the link 33, the link is placed out of reach of the hook 34, whereby the hook is prevented from engaging the link after the cheese is thrown out.

86 is a guide fixed in the machine frame for preventing casual lateral displacement of the link 33. 87 is a pin fixed in said guide to limit outward swinging movement of the link.

The traveling winder-tending mechanism comprises means (not herein shown) for swinging the lever 30 into the position shown in full lines in Fig. 14 after the end of the yarn on the cheese has been tied to the thread held in the clamp 49. Said traveling mechanism may also comprise means (as shown in my application Ser. No. 133,981) for operating upon the arms 38$^b$ and 43$^a$ during the process of effecting resumption of winding.

The means for resetting the detector and throw out mechanism comprises a series of projections and cam surfaces carried by the framework of the traveling winder-tending mechanism. (See Figs. 15 and 16.) The projection 88 is arranged to engage an arm 89 fixed to the rock shaft 80, said arm being substantially in the position indicated in Fig. 15 when the projection 88 approaches said arm. As the projection 88 passes the arm 89, the shaft 80 turns until the arm 84 is in the path of a projection 90. The engagement of the projection 90 with the arm 84 causes the arm to turn into the position shown in Fig. 16, in which position the arm 84 is held for the required length of time by the dwell 91. The turning of the shaft 88 brings the detector fingers 79 into position to allow the new thread to pass into contact with the fingers 78. The dwell 91 is interrupted by an opening 92 through which the new thread passes as the cheese is moved into contact with the cam drum, the thread passing into the zig-zag guideway 61 and through the entrance slot 58 into the guard 57. The tension of the thread causes it to spring into the hook 76 and the slot 65.

The movement of the shaft produced by the projections 88 and 90 causes the bent stop finger 93 on said shaft to follow the link 33 as the latter swings by gravity toward its normal position, thus preventing said link from swinging into the path of the hook 34. In the travel of the winder-tending mechanism, the incline 94 permits the arm 89 to swing into contact with a dwell 95 after which the inclined surface 96 permits the shaft 80 to turn still farther to place the detector fingers 79 in contact with the running thread. The detector fingers 79 are thus moved step by step toward their operative position so as not to strike the thread with undue momentum.

The stop finger 93 comprises a portion which is bent on the arc of a circle concentric with the shaft 80, thus enabling the finger to remain in position to limit rearward swinging movement of the link 33 during the swinging movements of said finger.

As hereinbefore stated, in the travel of the winder-tending mechanism, a projecting part (not shown) is carried against the end of the arm 74 (Fig. 12), whereby the yarn clearer is closed.

95 is a conveyer extending around the winder and serving to carry full bobbins into position where the operatives can conveniently take the bobbins and place them in the reserve bobbin-holders 47. 96 is a conveyer extending around the winder in position to receive spent bobbins discharged from the bobbin-holders 46.

This application is in the nature of a division or continuation in part of application Serial No. 628,474 filed May 25, 1911, application No. 657,529 filed October 30, 1911, and application Serial No. 809,797 filed December 31, 1913.

I claim as my invention:

1. A winder having, in combination, a movable support for the yarn mass being formed, a member attached to said support, a hook adapted to engage said member to move said support, a thread-controlled finger for moving said member into the range of action of the hook, and a stop finger moving with the other finger, to limit such movement of said member, said member normally being between said fingers.

2. A winder having, in combination, a movable support for the yarn mass being formed, a member attached to said support, a hook adapted to engage said member to move said support, a pivoted thread-controlled finger for moving said member into the range of action of the hook and a stop finger moving with the other finger, said member normally being between said fingers, to limit such movement of said member, said stop finger having a portion curved upon the arc of a circle concentric with the axis of said fingers so as to remain in position to limit movement of said member during the swinging movements of said stop finger.

3. A winder having, in combination, a standard, a lever pivoted between its ends on the upper end of said standard and arranged at its rear end to support the yarn mass being formed; a link attached to the other end of said lever; a hook adapted to engage the lower end of the link to cause the rear end of the lever to swing up and over center; and means yieldingly to limit the descent of the said rear end of the lever into position in front of the standard.

4. A winder having, in combination, yarn-mass rotating means, a lever for supporting a yarn-mass in contact with the rotating means, a member bearing against a portion of said lever and resisting movement of the yarn-mass away from the rotating means, and means actuated upon exhaustion of the thread for swinging the lever in the direction to remove the yarn mass from the rotating means and to remove said lever portion from contact with said member.

5. A winder having, in combination, a rotary drum having a yarn-traversing groove in its periphery, a pivoted arm arranged to support a yarn-mass in peripheral contact with and above said drum, a bobbin holder below the drum, a detector between the bobbin holder and the drum and a stationary flaring guard located close to the drum to inclose the thread traversed by the cam groove, the thread extending from the bobbin to the detector, thence through the guard, and thence through the cam groove of the drum to the yarn-mass.

6. A winder having, in combination, a rotary drum having a yarn-traversing groove in its periphery, a pivoted arm arranged to support a yarn mass in peripheral contact with and above said drum, a bobbin-holder below the drum, a detector between the bobbin-holder and the drum, and a stationary thread guard arranged between the detector and the drum, the thread extending from the bobbin to the detector, thence through the guard, and thence through the cam groove of the drum to the yarn mass.

7. A winder having, in combination, a movable support for the yarn mass being formed, a member attached to said support, a device for pulling said member to move said support, means withheld from action by the thread being wound for moving said member into operative relation to said device and a fulcrum against which the member is moved in the movement of the yarn-mass support, whereby the lower end of the member is swung away from the pulling device.

8. A winder having, in combination, a movable support for the yarn mass being formed, a member attached to said support, means for engaging said member to move said support, a finger for moving said member into position to be engaged by said engaging means, a spring tending to move said finger, a detector operatively connected to the finger and arranged to bear against the thread being wound, thereby to hold the finger against movement by the spring and a part operatively connected to the finger and located between the member and the engaging means for limiting movement of the member toward the engaging means.

9. A winder having, in combination, a movable support for the yarn mass being formed, a member attached to said support, a hook adapted to engage said member to move said support, a rock shaft having a finger arranged to move said member into position to be engaged by said hook, a spring tending to rock said shaft, a finger fixed to said shaft and arranged to bear against the thread being wound and thereby hold the shaft against rotation by the spring, and a stop finger on the shaft to limit movement of said member toward the hook, said member being normally between the first and last mentioned fingers.

10. A winder having, in combination, a standard, a lever pivoted between its ends on said standard and arranged at its rear end to support the yarn mass being formed; a link depending from the forward end of said lever; a hook adapted to pull said link down to swing said lever; a vertical rock shaft having a finger arranged to move said link rearwardly into position to be engaged by said hook; a spring tending to rock said shaft; and means controlled by the thread being wound to hold the shaft against rotation by the spring.

11. A winder having, in combination, a unit comprising means at its rear side for rotating a yarn-mass, a lever pivoted upon a horizontal axis located forwardly of said rotating means, the rear end of said lever being arranged to support a yarn mass in operative relation to said rotating means, two bobbin-holders located forwardly of the axis of said lever, a reserve-thread clamp above said bobbin-holders, and thread-controlled means for swinging said lever to place the yarn mass at a point forward of the axis of said lever.

12. A winder having, in combination, yarn-mass rotating means, a support arranged forwardly of said rotating means, a lever pivoted to said support above said rotating means to swing in a vertical plane, said lever being arranged at one end to support a yarn mass in peripheral contact with said rotating means, a bell crank pivoted to said support, a spring acting upon one arm of said bell crank, and a projection fixed with relation to said lever, the other arm of said bell crank being arranged to bear against said projection to press the yarn mass into contact with the rotating means.

13. A winder having, in combination, yarn-mass rotating means, a support arranged forwardly of said rotating means, a lever pivoted to said support above said rotating means to swing in a vertical plane, said lever being arranged at one end to support a yarn mass in peripheral contact with said rotating means, a bell crank pivoted to said support, a spring acting upon one arm of said bell crank, and two projections fixed with relation to said lever at opposite sides of its pivot, the other arm of said bell crank being arranged to bear against one of said projections to move the lever to press the yarn mass into contact with the rotating means, said other crank arm being arranged to bear against the other projection to cushion the end of the throwing-out movement of the lever.

14. A winder having, in combination, means for rotating a yarn mass, a pivoted lever for supporting a yarn mass in contact with said rotating means, a lug attached to said lever, a bell crank lever, one arm of which bears against the lug, and a spring acting upon the other arm of the bell crank lever to press the first mentioned arm of the bell crank lever against the lug.

15. A winder having, in combination, means for rotating a yarn mass, a lever pivoted in a plane above said rotating means for supporting a yarn mass in contact with said rotating means, a lug fixed to said lever at the axis thereof, a bell crank lever pivoted in a plane below said axis, one arm of which bell crank lever bears against said lug, and a spring acting upon the other arm of said bell crank lever to hold the first mentioned arm of the bell crank lever against said lug.

16. A winder having, in combination, means for rotating a yarn mass, a pivoted member for supporting a yarn mass in contact with said rotating means, a bell-crank lever, one arm of which is arranged to act upon said pivoted member, a spring acting upon the other arm of the bell-crank lever, and means to restrain the movement of the last mentioned arm under the action of the spring.

17. A winder having, in combination, yarn-mass rotating means, a pivoted lever for supporting a yarn-mass on said rotating means; a spring-pressed member against which a portion of said lever is arranged to bear to press the yarn-mass against said rotating means, said member tending to move in a certain direction; and means for restraining movement of said member in said direction.

18. A winder having, in combination, yarn-mass rotating means; a pivoted lever for supporting a yarn-mass on said rotating means; a bell-crank against which a portion of said lever is arranged to bear, a spring acting upon said bell-crank to resist movement of said lever portion in one direction; and means to prevent said bell-crank from following said lever portion when the latter moves in the opposite direction.

19. A winder having, in combination, yarn-mass rotating means; a pivoted lever for supporting a yarn-mass on said rotating means; a bell-crank against one arm of which a portion of said lever is arranged to bear; a spring acting upon the other arm of said bell-crank in opposition to said lever portion; and means acting upon said other bell-crank arm to restrain movement of the bell-crank under the influence of the spring.

20. A winder having, in combination, yarn-mass rotating means, a pivoted lever for supporting a yarn-mass on said rotating means; a bell-crank against one arm of which a portion of said lever is arranged to bear; a bell-crank, one arm of which underlies the other arm of the first mentioned bell-crank; and a spring strained between said other arm of the first mentioned bell-crank and the other arm of the second mentioned bell-crank.

21. A winder having, in combination, a yarn-mass-rotating drum having a yarn-traversing groove in its periphery, means for supporting a yarn mass in peripheral contact with the periphery of the drum, and a stationary guard the longitudinal center of which is located in a vertical plane bisecting the periphery of the yarn mass, said guard surrounding the thread to prevent the thread being wound from being thrown by said groove to a point outside the planes of the sides of the yarn mass.

22. A winder comprising means for supporting a winding couple, said couple consisting of a bobbin and a cross-wound yarn mass; and a tapering yarn guard between the members of the couple, the small end of the guard being directed toward the bobbin and the large end of the guard being directed toward the cross-wound yarn mass.

23. A winder comprising means for supporting a winding couple, said couple consisting of a bobbin and a cross-wound yarn mass; and a tapering yarn guard relatively close to the cross-wound yarn mass, the small end of the guard being directed toward the bobbin and the large end of the guard being directed toward the cross-wound yarn mass.

24. A winder comprising means for supporting a winding couple, said couple consisting of a bobbin and a cross-wound yarn mass; and a tapering yarn guard between the members of the couple, the small end of the guard being directed toward the bobbin and the large end of the guard being directed toward the cross-wound yarn mass, said guard having a slot in its forward side for the lateral entrance of the yarn.

25. A winder having, in combination, means for supporting a winding couple, said means including a cam drum and said couple consisting of a bobbin and a cross-wound yarn mass, a tapering yarn guard between the members of the couple, the small end of the guard being directed toward the bobbin and the large end of the guard being directed toward the cross-wound yarn mass, and means adjacent to the upper end of the guard for delaying engagement between the yarn and the cam drum until the cross-wound yarn mass has been accelerated.

26. A winder having, in combination, means for supporting a winding couple, said couple consisting of a bobbin and a cross-wound yarn mass, a yarn guard between the members of the couple, the small end of the guard being directed toward the bobbin and the large end of the guard being directed toward the cross-wound yarn mass, said guard having a slot in one side for the entrance of the yarn, and means adjacent to the upper end of the yarn guard providing a zig-zag passage for the yarn, said passage communicating with said slot.

27. A winder having, in combination, a cam drum, a cheese support movable to place the cheese in and out of contact with the drum, and means to delay full engagement of the yarn with the drum until the cheese has been accelerated.

28. A winder having in combination, a drum having a yarn-traversing cam-groove, a cheese support movable to place the cheese in and out of contact with the drum, a bobbin holder, and means providing a zig-zag passage for the thread extending between the cheese and the bobbin to delay lateral movement of the yarn into the cam groove.

29. A winder having, in combination, a drum having a yarn-traversing cam-groove, a cheese support movable to place the cheese in and out of contact with the drum, a bobbin holder, and means located adjacent to the drum and providing a zig-zag passage for the thread extending between the cheese and the bobbin to delay lateral movement of the yarn into the cam-groove.

30. A winder having, in combination, a series of shaft-sections, means for coupling said sections together with a degree of looseness, means for supporting the shaft-sections, and a cam-drum structure mounted on each shaft-section, said structure having a plurality of yarn-traversing grooves therein.

31. A winder having, in combination, a cam-drum structure comprising a series of sheet-metal cylinders, a member rigidly connected to each of the end cylinders, and means for connecting the intermediate cylinders to each other and to the end cylinders, each of said cylinders having a yarn-traversing groove therein.

32. A winder having, in combination, a shaft-section, a series of cylinders, a member connected to each of the end cylinders, means on the shaft for clamping said members to the shaft, and means for connecting the intermediate cylinders to each other and to the end cylinders, each of said cylinders having yarn-traversing means.

33. A winder having, in combination, a shaft-section, a series of cylinders, an inwardly dished member connected to each of the end cylinders, means on the shaft for clamping said members to the shaft, a portion of said means extending within one of the dished members, a bearing for supporting the shaft-section, said bearing extending within the other dished member, and means for connecting the intermediate cylinders to each other and to the end cylinders, each of said cylinders having yarn-traversing means.

34. A winder having, in combination, a lever pivoted between its ends and arranged at its rear end to support the yarn mass being formed; a link hanging from the forward end of said lever; a hook adapted to engage the lower end of said link and pull it down to raise the rear end of the lever; and thread-controlled means to effect engagement of the link with the hook.

In testimony whereof, I hereunto set my hand in the presence of two witnesses.

HOWARD D. COLMAN.

In the presence of—
GEORGE L. CHINDAHL,
MARGARET H. MANN.